United States Patent

Badessa

[15] 3,686,994

[45] Aug. 29, 1972

[54] ORGAN STOP MEMORY CIRCUIT

[72] Inventor: Rosario S. Badessa, Dedham, Mass.

[73] Assignee: Damon Corporation, Needham Heights, Mass.

[22] Filed: April 19, 1971

[21] Appl. No.: 135,051

[52] U.S. Cl. .................................84/345, 340/174 R

[51] Int. Cl. ..........................G10b 3/10, G11c 11/06

[58] Field of Search ..340/174; 307/88; 84/1.01, 345; 320/1

[56] References Cited

UNITED STATES PATENTS 3,498,168 3/1970 Cunningham ...............84/345

3,548,064 12/1970 Oncley .......................84/1.01

*Primary Examiner*—James W. Moffitt

*Attorney*—Kenway, Jenney & Hildreth

[57] ABSTRACT

In the organ stop memory circuit disclosed herein, a selected one of a plurality of magnetic memory cores associated with a given stop is read out by discharging a respective capacitor through a winding on the core. If a change in the sense of polarization of a core is detected during such a readout, the stop is set and a recharging pulse is applied to the entire set of charge storage capacitors. The particular capacitor which was discharged is recharged by this pulse, through the core winding, thereby resetting the polarization of that core to its original sense.

6 Claims, 1 Drawing Figure

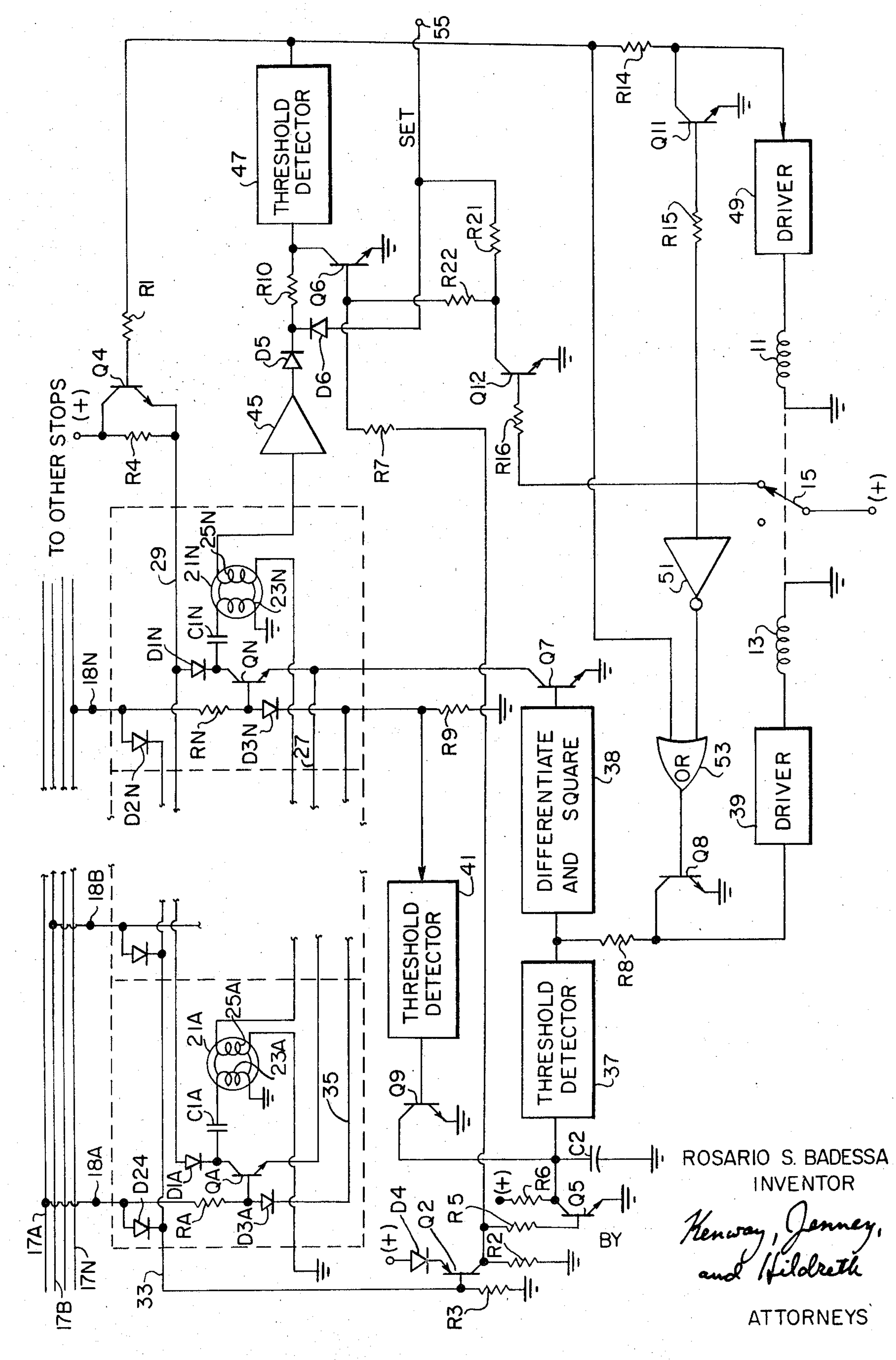
ROSARIO S. BADESSA
INVENTOR
BY Kenway, Jenney, and Hildreth
ATTORNEYS

ORGAN STOP MEMORY CIRCUIT

BACKGROUND OF THE INVENTION

This invention relates to a magnetic core organ stop memory circuit and more particularly to such a circuit in which information stored in the memory cores is read out destructively but is restored without the use of coincident current techniques.

While it has previously been proposed to provide automatic selection of organ stop combinations by employing magnetic memory cores of the type commonly utilized in digital computers, these devices have typically employed conventional coincident current techniques for restoring the binary information which is destructively read out of the cores. While coincident current techniques have been well worked out in the field of computer technology, it has been found that this technique is not well suited to the more severe environment of an organ in typical service. For example, in order to provide a satisfactorily distinguishable difference between a single so-called half-write current from a pair of coincident half-write currents, relatively precise regulation of power supply voltages or currents is required. Such regulation is normally not provided by the power supplies conventionally associated with organ stop controls.

Likewise, in designing organ stop combining systems, it is highly desirable that the system be flexible or expandable so as to accommodate different groupings and/or numbers of stops, so that a given basic system can be adapted to a variety of particular organ installations. The typical computer memory plane, on the other hand, is ordinarily designed with a fixed number of rows and columns so that the number of bits of information available is not readily changeable, except by multiples of the large number of elements incorporated in a given plane.

Among the several objects of the present invention may be noted the provision of a novel organ stop memory; the provision of such a memory employing magnetic memory cores; the provision of such a circuit in which binary information destructively read out of a given memory core is automatically restored; the provision of such a memory in which binary information destructively read out of a memory core is restored without the use of coincident currents; the provision of an organ stop memory circuit for causing a given stop to be set in response to the selection of predetermined ones of a plurality of organ voice combinations; the provision of such a memory circuit which is highly reliable and which is of relatively simple and inexpensive construction. Other objects and features will be in part apparent and in part pointed out hereinafter.

SUMMARY OF THE INVENTION

Briefly, an organ stop memory circuit according to the present invention is adapted for use to control an organ stop which may be used in any one of a plurality of voice combinations. A plurality of magnetic memory cores are utilized, one for each combination. Each core is linked by a first winding which is adapted to magnetically polarize the core in either sense. A respective charge storage capacitor is interconnected with each of these windings and, for each storage capacitor, there is provided a respective switching means, operable in response to the selection of a respective one of the voice combinations, for discharging the capacitor through the associated first winding thereby to polarize the respective core in a first predetermined sense, irrespective of the original magnetic sense of the core. Further means are provided, including a second winding on each of the cores, which respond to a change in the magnetic polarization of any one of the cores to said first sense from the opposite magnetic sense, during selection of one of the voice combinations, for setting the respective stop. At essentially the same time, any discharged storage capacitor is recharged through the respective first winding thereby restoring the polarization of the respective memory core to its original magnetic sense.

BRIEF DESCRIPTION OF THE DRAWING

The single FIGURE of the drawing is a schematic circuit diagram of an organ stop memory circuit according to the present invention.

DESCRIPTION OF THE PREFERRED EMBODIMENT

The circuitry shown in the drawing is that utilized for controlling the operation of a single organ stop. A plurality of such circuits are utilized to form a complete organ memory unit. As is conventional, the organ stop is provided with a pair of solenoids 11 and 13 for moving the stop to the ON and OFF positions, respectively. As is also conventional, a switch is provided, indicated at 15, which operates with the stop and serves to provide an electrical indication of the condition of the stop at any given moment. Throughout the explanation of the circuit, positive logic is assumed for simplicity of explanation. It is likewise assumed that appropriate supply voltages of the polarity noted are provided at various points, as indicated in the drawing itself.

As is understood, it is desirable that each stop be utilizable in any one of a plurality of preset stop combinations. In other words, the information defining each preset combination should be stored in some sort of preset memory and be called forth on demand. The knob or switch which calls forth a given combination is conventionally designated a "piston" in conventional organ terminology. Positive signals indicating the actuation of respective pistons are provided through leads 17A–17N. These signals are applied to the memory circuit through terminals 18A–18N. As will be understood, leads 17A–17N are also connected to other similar stop control circuits in parallel for providing the piston signals to these circuits also. As will be apparent hereinafter, it is an advantage of the memory arrangement of the present invention that the circuitry and memory for controlling each stop is essentially independent of the other stops and that an arbitrary number of such stop control circuits may be employed in a given system by merely wiring the corresponding piston terminals to common bus leads extending to all or groups of the individual stop control circuits.

Included in the control circuitry for each stop are a plurality of magnetic memory cores 21A–21N, the number of cores corresponding to the number of preset combinations within which the given stop may be considered for inclusion. Each core is linked by a respective first or driving winding 23A–23N and a respective output winding 25A–25N. One end of each of the driving windings 23A–23N is grounded and the other end is connected to a respective charge storage capacitor ClA–ClN. The other end of each charge storage capacitor is connected to the collector of a respective drive transistor QA–QN. The emitters of transistors QA–QN are connected to a common bus 27, while the collectors are connected, through respective diodes DlA–DlN, to a common collector bus 29. A small or so-called trickle current applied to bus 29 through a resistor R4 keeps the capacitors ClA–ClN charged. Resistor R4 is shunted by an NPN transistor Q4, but this transistor is normally non-conducting. Each of the piston signal input terminals 18A–18N is connected to the base of a respective one of the driver transistors QA–QN through a respective bias resistor RA–RN. These connections also continue, through respective isolating diodes D3A–D3N, to a common bus 35. The piston signal input terminals 18A–18N are also connected, through respective isolating diodes D2A–D2N, to a common bus 33.

A positive piston signal, applied to any one of the terminals 18A–18N, biases the respective drive transistor QA–QN in a sense tending to produce conduction. However, conduction will actually be produced only if the common emitter bus 27 is somehow connected to ground. Initially, this is not the case as the bus 27 is grounded only through an NPN transistor Q7 which is normally non-conducting. Thus, the bus 27 essentially floats in potential upon the initial application of a positive piston signal.

Positive piston signals coupled to the bus 33 through any one of the diodes are also applied to the base of a PNP transistor Q2 so as to bias it into non-conduction. Transistor Q2 is provided with a load resistor R2 and is normally biased into conduction by means of a resistor R3. An appropriate cutoff threshold voltage is obtained by means of the forward bias drop across a diode D4 in the emitter lead of transistor Q2. The collector signal from transistor Q2 is applied, through a bias resistor R5, to the base of an NPN transistor Q5 having a load resistor R6. Thus, transistor Q5 is likewise turned off when transistor Q2 is turned off by a piston signal. The collector voltage from transistor Q2 is also applied, through a bias resistor R7, to the base of an NPN transistor Q6 which, as is described in greater detail hereinafter, functions as a shunt to provide certain logic operations.

When transistor Q5 is turned off the current available through resistor R6 charges a capacitor C2 at a predetermined rate. This rising voltage is applied to a threshold detector or Schmitt trigger circuit 37 to obtain a delayed switching signal with respect to the initiating switching signal. This delay is used to mask any contact bounce which may occur in the switches which provide the piston signals applied to terminals 18A–18N. The square wave switching signal obtained from the threshold detector 37 is differentiated and squared, as indicated at 38, to obtain a short square wave pulse of predetermined duration. As is explained in greater detail hereinafter, this pulse, hereinafter referred to as the READ pulse, is used to read out the magnetic memory cores 21A–21N. For this purpose a pulse of duration of about 25 microseconds is appropriate. This pulse is applied to turn on the driver transistor Q7 which is connected so as to shunt the bus 27 to ground when so energized. Like the discharge transistors QA–QN and the recharging transistor Q4, this readout transistor Q7 operates as a current switching means.

The switching signal obtained from the threshold detector circuit 37 is also applied, through an isolating resistance R8, to a driver amplifier 39 for energizing the OFF solenoid 13. This action may, however, be inhibited by an NPN shunt transistor Q8, as described hereinafter.

In addition to forward biasing the respective driver transistors QA–QN, the currents provided through the resistors RA–RN upon the actuation of any of the pistons are also applied, through bus 35 to a resistor R9, the other end of which is grounded. The voltage developed across resistor R9 is applied to a threshold detector circuit 41. The threshold level and the value of resistor R9 are selected so that, if more than one piston is depressed at once, the resulting current will cause the threshold detector 41 to be tripped. The output signal from the threshold detector is applied to an NPN transistor Q9 which is connected so as to shunt the capacitor C2. This prevents that capacitor from charging upon the actuation of more than one piston and thereby inhibits the generation of a READ pulse under such conditions.

The normal operation of the read circuitry thus far described is substantially as follows, it being assumed initially that only one piston has been operated. Upon the actuation of any one piston, the respective drive transistor QA–QN is biased toward conduction but does not immediately conduct since the bus 27 is essentially "floating" in potential. The actuation of the piston, however, also turns off transistors Q2 and Q5, allowing the capacitor C2 to charge. After a predetermined delay, which masks any piston contact bounce, the capacitor voltage triggers the threshold detector 37. The resultant step signal is differentiated and squared so as to cause a brief pulse of conduction through transistor Q7, the READ pulse. During this pulse, the bus 27 is effectively grounded so that the selected one of the driver transistors QA–QN conducts. Since the charge storing capacitors ClA–ClN are all charged, as described previously, a pulse of current in a first direction is transmitted through the drive or input winding (23A–23N) of the respective magnetic core. This pulse of current magnetically polarizes the core in a first direction or orientation which, for simplicity of explanation, is designated the OFF state of the core and corresponds to the OFF state of the respective organ stop. This placing in the OFF state occurs whether the core was previously in the same state or in the opposite state. This "opposite" state is designated the ON state in correspondence with the ON condition of the respective organ stop. If the placing of the core in the OFF condition constitutes a reversal in state, i.e. a change from a previously ON condition, a pulse will be generated in respective output winding 25A–25N which are connected in series as indicated in the drawing. Thus, if any core reverses magnetic state or orientation, an output pulse is generated. This output pulse is applied to a sensing amplifier 45. It should be noted, however, that only the core corresponding to the selected piston is actually read out during any given read cycle, discharge of the charge-storage capacitors corresponding to the other preset combinations being prevented by the diodes DIA–DIN. If desired, the input circuit for amplifier 45 may include a toroidal step-up transformer for impedance matching.

The amplified magnetic core output pulse, of obtained, is applied, through a diode D5 and an isolating resistance R10, to a threshold detector 47. Threshold detector 47 is of the latching type so that once the input threshold is exceeded, a positive output signal, designated the RESET signal, is obtained until the input is positively shunted by conduction through transistor Q6. Since transistor Q6 is normally biased into conduction between piston actuations by the signal taken from the collector of transistor Q2, noise pulses cannot trigger the RESET signal in the typically long intervals between piston actuations.

The output signal from threshold detector 47 is applied, through a bias resistor R1, to the transistor Q4 so as to bias it into conduction. Conduction through transistor Q4 provides a positive current source at relatively low impedance to the bus 29 and thus also to the charge storing capacitors ClA–ClN. Assuming that the transistor Q4 is turned on almost immediately after a core has been read out, the particular charge storing capacitor which was discharged by the READ pulse will not have been recharged by the trickle current provided through resistor R4. Thus, the application of this low impedance positive current source will cause the capacitor to recharge abruptly through the respective core input winding 23A–23N. This current pulse, being in the opposite direction from the current produced by the READ pulse, will cause the core to be reset, i.e. to be put into its ON state. Since the diodes DIA–DIN prevent the other charge storing capacitors from being discharged, these other capacitors will not pass enough current during the reset cycle to cause their respective magnetic memory cores to be changed in magnetic orientation.

The signal obtained from the threshold detector 47 is also applied, through a resistor R14, to a driver amplifier 49 for energizing the ON solenoid 11. This action, however, may be inhibited by an NPN shunt transistor Q11, connected across the input of the driver amplifier, as described hereinafter.

The switch 15 which operates with the stop is connected to provide a positive signal voltage when the stop is in its ON condition. This signal voltage is applied, through a resistor R15, to forward bias the transistor Q11. Thus, when the stop is already in its ON condition, the solenoid 11 cannot be energized. This stop condition signaling voltage is also inverted, as indicated at 51, and is applied as one input to an OR gate 53. The output signal from the OR gate is applied to energize the shunt transistor Q8 which inhibits the operation of the OFF solenoid driver amplifier 39. As will be understood, this connection prevents operation of the OFF solenoid when the stop is already in its OFF condition. The RESET signal obtained from the latching threshold detector 47 is applied as the other input to the OR gate 53.

The signal voltage provided by switch 15 is also applied, through a resistor R16, to selectively energize a shunt transistor Q12, which functions during the memory setting operation. During setting of the memory, a positive SET signal voltage is applied to a terminal 55. This signal is coupled, through a diode D6, so as to provide a signal which, like the amplified core output signal, will trigger the threshold circuit 47 in the absence of conduction through the shunt transistor 06. This SET voltage is also applied to the shunt transistor Q6, through resistors R21 and R22, so as to turn on that transistor Q6. This source of bias current to transistor Q6 can, however, be selectively shunted by conduction through the transistor Q12, the collector of transistor Q12 being connected to the junction between the resistors R21 and R22.

The overall operation of the stop memory circuit is as follows. Upon the actuation of a selected piston, the respective one of the transistors QA–QN is forward biased. After a predetermined delay provided by the charging of capacitor C2, which masks any contact bounce, the common emitter bus 27 is momentarily grounded through transistor Q7 so that the charge storing capacitor connected to the respective driver transistor QA–QN is discharged through the respective core driving winding 23A–23N. If a core output pulse is obtained, indicating that the respective magnetic core was previously in the ON state, the core is reset by abruptly recharging the respective charge storage capacitor through transistor Q4. Simultaneously, the ON solenoid 11 is energized if the stop was not already in its ON condition. The generation of the RESET signal by the threshold circuit 47 also causes the transistor Q8 to conduct, inhibiting the READ pulse from causing the energization of the OFF solenoid. When the piston is released, the transistor Q6 is re-energized allowing the circuit to return to its initial state existing before the piston was actuated.

If, on the other hand, no core output pulse is obtained, indicating that the respective core was already in its OFF state, the signal obtained from the threshold detector 37 will be applied, through the driver amplifier 39 so as to energize the OFF solenoid and to return the stop to its OFF condition. The energization of the OFF solenoid is, however, inhibited by transistor Q8 if the stop is already in its OFF condition. After the respective piston is is released, the corresponding charge storage capacitor is recharged relatively slowly through resistor R4, the current level being too low to reset the respective magnetic memory core.

To store a new combination into the memory, the following steps are taken:

1. first, each stop is manually set in correspondence with the desired combination;
2. a positive set signal is applied to the terminal 55; and
3. during application of the set signal, the piston which is to subsequently call forth that combination is actuated.

If the stop is in its ON condition when the piston is actuated, the transistor Q6 will be de-energized when transistor Q2 is de-energized by piston actuation, since the bias which could be provided to transistor Q6 by the SET signal is shunted by transistor Q12. Accordingly, after the READ pulse is initiated by the piston actuation, the RESET signal will be immediately present and the magnetic core corresponding to the selected piston will be set into its ON magnetic orientation or state without regard for its pre-existing state. While transistor Q4 may be biased on during the READ pulse provided by Q7, there is still sufficient residual source impedance so that the read out cycle can take place even though the capacitor is immediately recharged through Q4. The inverted SET signal, applied to transistor Q8 through the OR gate 53, prevents the signal from threshold detector 37 from operating the OFF solenoid during this operation. On the other hand, with the stop in the OFF state, transistor Q12 will not conduct and thus the set voltage, applied through resistors R21 and R22 will cause transistor Q6 to conduct, inhibiting the RESET signal. Accordingly, the READ pulse will leave the selected core in its OFF state. Since no RESET signal is generated, the ON solenoid is not energized.

While various logic circuits have been represented in conventional symbolic form, it should be understood that that circuits themselves may be constructed of discrete circuit components so as to be easily compatible with a system designed to be run on available organ supply voltages and so as to provide a noise immunity consistent with the typical organ environment. Similarly, it should be understood that other logic functions may be associated with the memory circuitry, for example, additional signals, common to several stop memory circuits, may be provided to initiate resetting of all stops, or all stops within a given division or category, to their OFF state irrespective of the state of the memory and without disturbing the memory. Logical gating appropriate for providing such functions will be apparent to those skilled in the art.

Since the d.c. potential across any one of the charge storage capacitors is essentially immaterial, it should be understood that the terms "discharging" and "charging" as used herein and in the claims should be understood only as calling for changes in the capacitor charge which are in opposite directions and not as implying any given direction of change in the absolute value of the charge on any capacitor.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An organ stop memory circuit for use with an organ stop which is useable in a plurality of voice combinations, said memory circuit comprising:

a plurality of magnetic memory cores, one for each of said combinations;

for each core, a first winding linking the core and adapted to magnetically polarize the core in either sense;

for each of said first windings, a charge storage capacitor;

for each storage capacitor, switching means operable in response to the selection of a respective one of said voice combinations for discharging the respective capacitor through the respective first winding thereby to polarize the respective core in a first sense; and means, including a second winding on each of said cores, responsive to a change in the magnetic polarization of any one of said cores to said first sense from the opposite magnetic sense, during selection of one of said voice combinations, for setting said stop and for recharging any discharged storage capacitor through the respective first winding for restoring the polarization of the respective core to said opposite magnetic sense.

2. An organ stop memory circuit for use with an organ stop which is useable in a plurality of voice combinations, said memory circuit comprising:

a plurality of magnetic memory cores, one for each of said combinations;

for each core, a first winding linking the core and adapted to magnetically polarize the core in either sense;

for each of said first windings, a charge storage capacitor;

for each storage capacitor, first switching means operable in response to the application of a respective input signal indicating the selection of a respective one of said voice combinations for discharging the respective capacitor through the respective first winding thereby to polarize the respective core in a first sense;

means, including a second winding on each of said cores, responsive to a change in the magnetic polarization of any one of said cores to said first sense from the opposite magnetic sense, during selection of one of said voice combinations, for generating an output signal;

drive means responsive to said output signal for setting said stop;

second switching means, responsive to said output signal, for abruptly recharging any discharged storage capacitor through the respective first winding for restoring the polarization of the respective core to said opposite magnetic sense; and means for recharging any discharged storage capacitor which is not recharged by said second switching means, relatively slowly and without changing the magnetic polarization of the respective core.

3. A memory circuit as set forth in claim 2 further comprising means responsive to the application of input signals corresponding to the selection of more than one combination for inhibiting operation of said first switching means.

4. A magnetic core memory circuit for holding a predetermined plurality of binary information bits, said memory circuit comprising:

a plurality of magnetic memory cores, one for each bit of binary information to be held;

for each core, a first winding linking the core and adapted to magnetically polarize the core in either sense;

for each of said first windings, a charge storage capacitor;

a plurality of input terminals for receiving input signals defining which of said plurality of bits of information is to be read out;

for each storage capacitor, first switching means operable in response to a respective input signal for abruptly discharging the respective capacitor through the respective first winding thereby to polarize the respective core in a first sense;

means, including a second winding on each of said cores, responsive to a change in the magnetic polarization of any one of said cores to said first sense from the opposite magnetic sense, during discharge of the respective storage capacitor, for providing an output signal indicating the previously existing state of the respective core;

second switching means, responsive to an output signal indicating that the polarization of the selected core was previously in said opposite sense, for abruptly recharging any discharged storage capacitor through the respective first winding for restoring the polarization of the selected core to said opposite magnetic sense; and means for recharging any discharged storage capacitor which is not recharged by said second switching means, relatively slowly and without changing the magnetic polarization of the respective magnetic core.

5. A magnetic core memory circuit for holding a predetermined plurality of binary information bits, said memory circuit comprising:

a plurality of magnetic memory cores, one for each bit of binary information to be held;

for each core, a first winding linking the core and adapted to magnetically polarize the core in either sense;

for each of said first windings, a charge storage capacitor which is interconnected with one end of the respective first winding;

a plurality of input terminals for receiving input signals defining which of said plurality of bits of information is to be read out;

for each storage capacitor, a discharge transistor, the collector terminal of which is interconnected with the respective capacitor, the respective input terminal being interconnected with the base terminal of each transistor for biasing that transistor toward conduction when the respective bit is to be read out;

a charging transistor, interconnected with said capacitors through respective diodes, for charging any discharged capacitor when a reset signal is applied to said charging transistor;

a readout transistor, the emitter terminals of said discharge transistors being connected in common through said readout transistor to the other end of said first windings thereby to cause a forward-biased discharge transistor to discharge the respective storage capacitor when the readout transistor conducts;

and means, including a second winding on each of said cores, responsive to a change in the magnetic polarization of any one of said cores to said first sense from the opposite magnetic sense, during discharge of the respective storage capacitor, for applying a reset signal to said charging transistor thereby to restore the polarization of the selected core to said opposite magnetic sense; and means for selectively forward biasing said readout transistor after an input signal is applied to one of said input terminals.

6. A memory circuit as set forth in claim 5 further comprising means for inhibiting conduction through said readout transistor if more than one of said discharge transistors is forward biased.

* * * * *